C. L. SPENCER.
RAISIN SEEDER.
No. 45,355.
Patented Dec. 6, 1864.
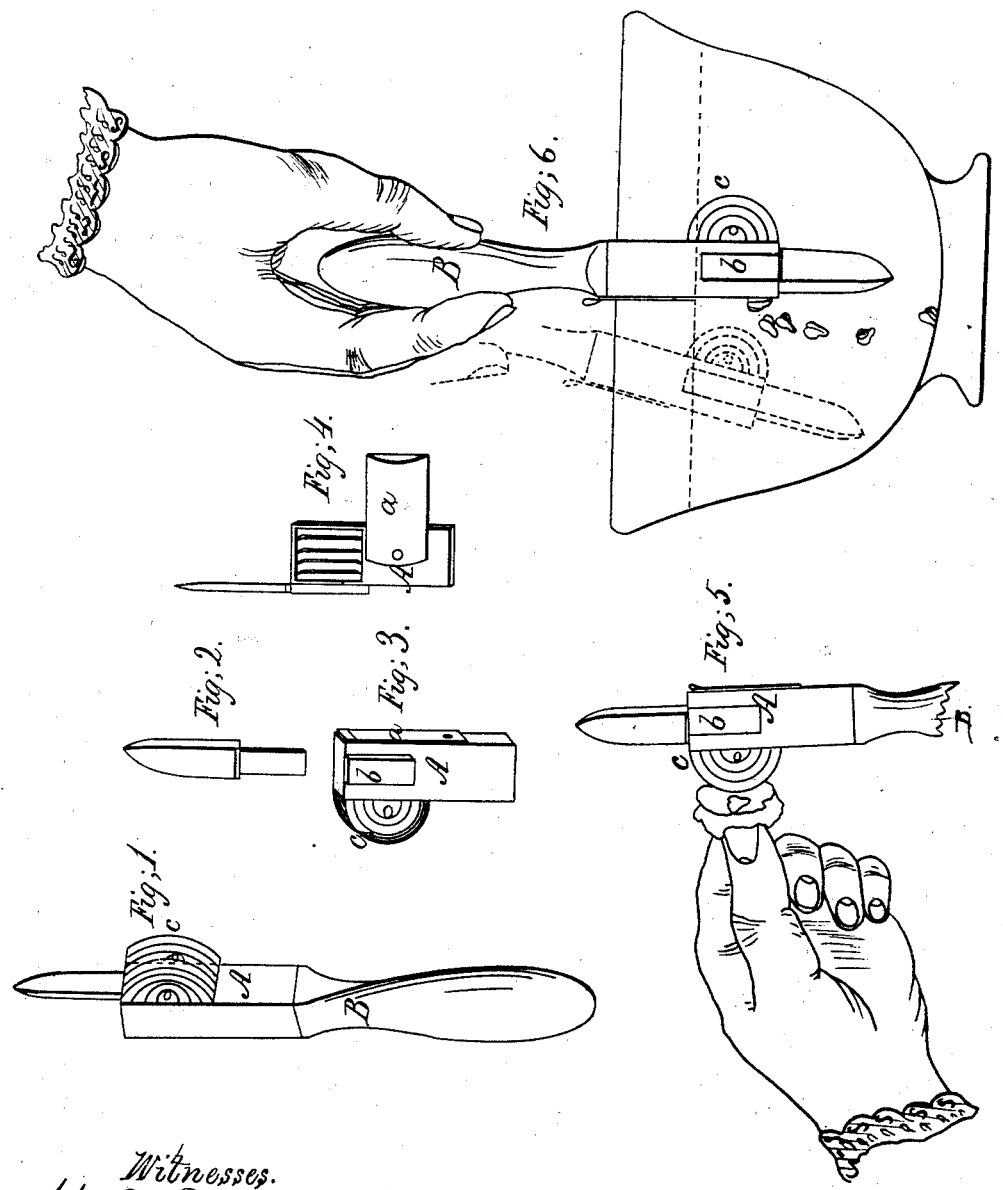
Witnesses.
John D. Thurston.
John H. Stines
Inventor.
Charles L. Spencer.

UNITED STATES PATENT OFFICE.

CHARLES L. SPENCER, OF PROVIDENCE, RHODE ISLAND.

IMPROVED RAISIN-SEEDER.

Specification forming part of Letters Patent No. 45,355, dated December 6, 1864.

*To all whom it may concern:*

Be it known that I, CHARLES L. SPENCER, of the city and county of Providence, in the State of Rhode Island, have invented a new and Improved Machine for Seeding Raisins; and I do hereby declare that the following specification, taken in connection with the drawings, making a part of the same, is a full, clear, and exact description thereof.

Figure 1 is a perspective view. Figs. 2, 3, and 4 are detailed parts. Fig. 5 shows the manner in which the machine is used in order to perform the work designed. Fig. 6 shows the manner in which the seeds which have accumulated in the receptacle for them in the machine are removed.

In the accompanying drawings, A, Figs. 1 and 3, is a box or chamber for the collection of the seeds of the raisins, which is attached to the handle B. This seed-chamber has a cover, a, upon its top, which may be made to slide in proper grooves or turn upon a pivot for the purpose of allowing the contents of the chamber to be discharged.

Upon the under side of the box and forming an addition to the same is a projecting grating, C, the surface of which is made of flexible wires of German silver or other suitable material possessing sufficient elasticity, arranged parallel to each other, while the sides can be made either of similar wires arranged concentrically, or of metal perforated with holes. These wires are placed so near to each other that when a seed of a raisin is placed within the chamber it will not fall through a space between the wires, but nevertheless the wires will allow of the passage of a seed between them upon the application of a moderate lateral pressure to spring them apart.

It is not essential to my improved instrument for the purpose declared that it should have a knife-blade attached to it for cutting open the skin of the raisin; but it is very convenient to have such an attachment, and I have therefore made use of one, which is represented at Fig. 2, the shank of which fits into a holder, b, upon the side of the seed-chamber, and can be removed at pleasure.

The instrument is to be used in the following way: The raisin is pressed between the thumb and forefinger of the left hand, so as to force the pulp in which the seeds are located to one side. The skin at this place, being now distended, is cut with the blade of the knife, when the sides naturally gape open. In this position the pulp of the raisin is gently pressed against the surface of the wires, Fig. 5, when, by increasing the pressure of the thumb and forefinger, the seeds are squeezed through the pulp and are sprung through the wires into the chamber, where they remain. After the seed-chamber has become inconveniently full of seeds the cover a is opened and the instrument shaken rapidly two or three times in a bowl of water, Fig. 6, by which means the chamber will be readily washed out.

It will be observed that the instrument acts upon the principle of a series of spring-fingers, arranged parallel to each other, so as to present to the pulp of the raisin a broad surface and not cut the same, in combination with a chamber to hold the seeds, which, by the action of the thumb and forefinger of the operator, are pressed between the fingers of the instrument.

With a little practice a person can perform the hitherto tedious and uncleanly operation of seeding raisins with great rapidity and ease by the use of an instrument which acts upon the principle which I have described.

What I claim as my invention, and desire to secure by Letters Patent, is—

The improved instrument for seeding raisins, as described, when constructed to operate in the manner substantially as specified.

CHARLES L. SPENCER.

Witnesses:
JOHN D. THURSTON,
JOHN H. STINESS.